May 29, 1962
D. R. TELSON
3,037,117
FILM DEVELOPING ENVELOPE
Filed Nov. 13, 1959
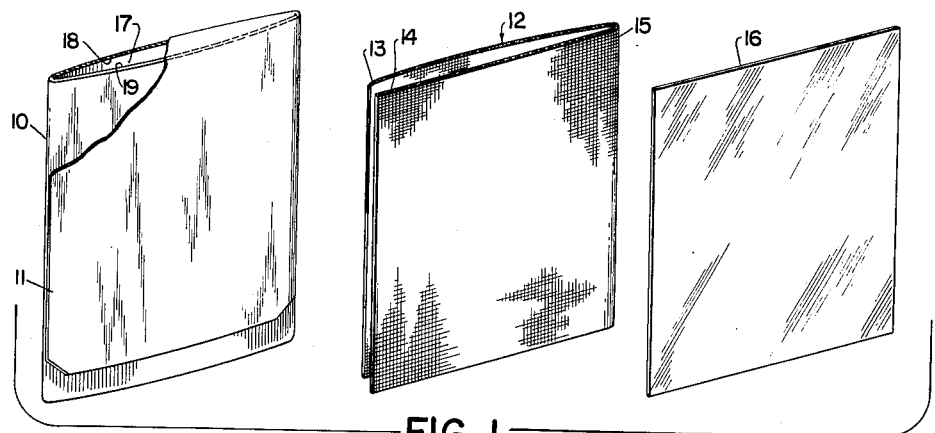
FIG. 1.
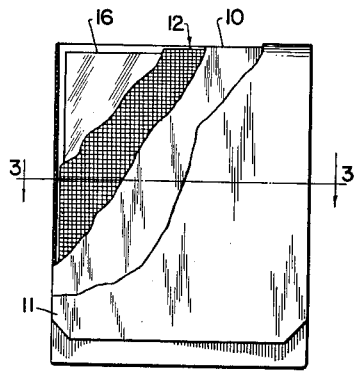
FIG. 2.
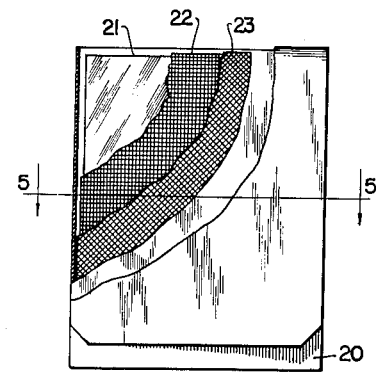
FIG. 4.
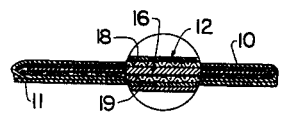
FIG. 3.
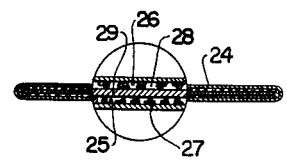
FIG. 7.
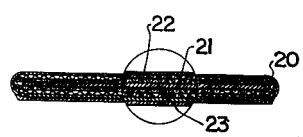
FIG. 5.
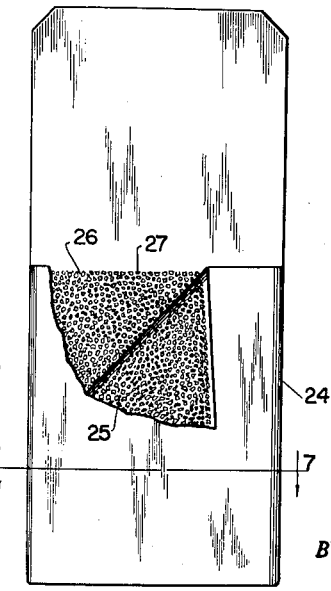
FIG. 6.
INVENTOR.
DAVID R. TELSON.
BY
ATTORNEY

United States Patent Office 3,037,117
Patented May 29, 1962

3,037,117
FILM DEVELOPING ENVELOPE
David R. Telson, 950 Ocean Ave., Brooklyn 26, N.Y.
Filed Nov. 13, 1959, Ser. No. 852,699
6 Claims. (Cl. 250—68)

This invention relates to film packages, and is particularly, although not exclusively, directed to envelopes containing X-ray films for daylight development.

Various expedients have heretofore been employed for the development of films in daylight, so as to eliminate the obvious difficulties and inconveniences inherent in conventional darkroom techniques. Such expedients generally involve the use of relatively complex and costly developing tanks, most of these requiring loading in the dark. Where special cameras are employed, such as the "Polaroid" cameras for X-rays, the costs are frequently prohibitive; and furthermore, the emulsion speed of the film is such as to reqiure what in the opinion of many are unduly long exposure periods. In the case of large films, and particularly X-ray films for relatively large areas, the almost invariable practice—where definition is required—is to employ suitably-sized developing, fixing and washing tanks in light-sealed rooms. During certain surgical operations where X-ray determinations must be made during the progress of the operation, it is a matter of critical importance that the film be processed as close as possible to the locale of operation—a condition which very often is not met under existing hospital arrangements.

It is the primary object of my invention to provide a means of making special type films—such as X-ray films or those sensitized to radiations or energy rays of selected frequencies like infra-red rays—to be processed in daylight by conventional developing techniques, and by using open developing tanks. And in this aspect of my invention, it my further objective to obviate the use of such films or techniques that require unduly long exposures.

In the accomplishment of the above-mentioned objectives, I employ a novel water permeable envelope completely encasing the film, the material of the envelope being transparent to a selected type of ray or radition frequency, but opaque to the visible portion of the spectrum. The components of the invention are such as to enable the encased film to be operatively exposed to the action of the rays, and further to permit the fully enveloped exposed film to be immersed in an open developing tank, whereby the developing solution will penetrate the envelope and engage the film emulsion for full developing action. The subsequent steps of washing and fixing can be accomplished in the same manner without removing the envelope.

In accordance with another object of my invention, means are provided to keep the film from adhering to the inner surface of the envelope, thereby obviating the possibility of incomplete or faulty development of areas of the film.

It is my further object to provide a simple, inexpensive, compact, readily fabricated and easily assembled device having the features aforesaid.

Other objects, features and advantages will appear from the drawings and the description hereinafter given.

Referring to the drawings,

FIGURE 1 is a disassembled perspective view of the three components constituting one embodiment of my invention.

FIGURE 2 is a front elevation of the assembled combination of the components shown in FIG. 1, portions being broken away for clarity.

FIGURE 3 is a section of FIG. 2 taken along line 3—3.

FIGURE 4 is a front view of another embodiment of my invention, with fragments broken away for clarity.

FIGURE 5 is a section of FIG. 4 taken along line 5—5.

FIGURE 6 is a front view of the envelope of another embodiment of my invention, a fragment being removed and a portion of the envelope shown torn and folded back for purposes of clarity.

FIGURE 7 is a section of FIG. 6 taken along line 7—7, showing a film operatively in place, a fragment being shown enlarged for clarity.

The various embodiments of my invention illustrated represent film packages especially adapted for X-ray purposes. Each contains an outer envelope—the film container—that is water permeable and transparent to X-rays, and also contains barrier means for separating the film from the adjacent inner surfaces of the envelope, as will more clearly hereinafter appear. It is preferred that the said envelope be made of black filter paper, and that the barrier means be made of plastic material that is transparent to X-rays but that permits the passage therethrough of water.

In the form of my invention illustrated in FIGS. 1 to 3, the outer envelope or container 10, made of water permeable and X-ray transparent material, contains the flap 11 which, when operatively closed, completely seals the interior of the envelope. The barrier means in this form of my invention comprises the folded sheet of screening 12, comprising the opposite panels 13 and 14 joined at the lateral fold 15. It is preferred that sheet 12 be made of a plastic material, like vinyl coated fibreglass or other material transparent to X-rays and not chemically affected by conventional developing and fixing solutions. The screening sheet 12 consists of a meshwork of fiber elements sufficiently spaced so as to permit the free passage therethrough of water and the developing and fixing solutions.

In the operation of this device, a film 16 is positioned between the panels 13 and 14 of the barrier member 12, the assembled film and barrier member being positioned within compartment 17 of the envelope 10. When the flap 11 is operatively closed, the entire package is in condition to be operatively exposed to X-rays, in the manner in which conventionally sealed X-ray films are exposed. Inasmuch as the material of the envelope 10 and of the barrier member 12 are transparent to X-rays, as aforesaid, every portion of the film emulsion is fully exposed to the action of the X-rays.

The package, including the exposed film, is then immersed in an open developing tank. Due to the fact that the material of envelope 10 is water permeable, the developing solution will pass through the envelope and through the meshes of panels 13 and 14, to contact the film emulsion. Although the said panels 13 and 14 of the barrier member obviously permit the passage therethrough of the developing fluid, they keep the film spaced from the inner surfaces 18 and 19 of the said envelope 10, thereby preventing any adhesion of the said surfaces with the adjacent surfaces of the film. The barrier member 12 and film 16 are not in tight pressing engagement with each other, nor are the said panels 13 and 14 in tight pressing engagement with the inner surfaces 18 and 19 of the envelope. Accordingly, the developing solution will be able to reach the entire emulsion surface of the film, to produce a clear image after full development. The washing and fixing operations are performed in similar manner, also in open tanks.

In the form of my invention illustrated in FIGS. 4 and 5, I employ a water permeable container 20, a film 21, and a barrier member 22 of screening material like that above described. In addition, there is a second barrier member 23 consisting of a folded sheet of limp water-pervious material, such as cheese cloth. It has been found that by the use of the screen barrier 22 and the limp barrier 23, with the latter positioned adjacent to the inner surfaces of the envelope, complete exposure can be had with additional assurance that the film 21 will not come in contact and adhere to the inner surfaces of the envelope. It is, of course, understood that the material of the second barrier 23 permits the passage therethrough of water, and is made of an X-ray transparent substance.

In the embodiment of my invention illustrated in FIGS. 6 and 7, an envelope 24 is used, also made of water permeable, X-ray transparent material. The inner surfaces 25 and 26 of the envelope are, however, coated with separated particles 27 of X-ray transparent material, such as Bakelite. Said particles are applied in any manner known to those skilled in the art, such as by spraying or painting said inner surfaces with a liquid vehicle containing said particles 27. It will be noted that because there are spaces 28 between said particles, the developing solution will be able to pass therebetween to engage film 29. However, since the said particles 27 extend inwardly from the said surfaces 25 and 26 of the envelope 24, it is apparent that the film 29 will be kept from engaging and adhering to the said surfaces 25 and 26. It is thus evident that the package consisting of the envelope 24 and the film 29 can be operatively exposed and developed in the manner aforesaid in daylight, to obtain fully developed and clear images.

It is, of course, understood that the outer envelopes in the various embodiments of my invention are opaque to light, so that when the envelope is completely sealed, the film therein will be in complete darkness.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a daylight development film package, a film sensitive to a selected form of radiation, a container completely enveloping said film, and barrier means within said container disposed between the interior surface of said container and said film and substantially coextensive with said film and protecting said film from adhering to the interior surface of said container; the material of said container being water permeable and opaque to light, said barrier means comprising a plurality of spaced elements to permit the operative passage of developing liquid therebetween, the material of said container and said barrier means being transparent to said form of radiation.

2. In a daylight development X-ray film package, an X-ray film, a container completely enveloping said film, and barrier means within said container disposed between the interior surface of said container and said film and substantially coextensive with said film and protecting said film from adhering to the interior surface of said container; the material of said container being opaque to light, said barrier means comprising a plurality of spaced elements to permit the operative passage of developing liquid therebetween, the material of said container and said barrier means being transparent to X-rays.

3. In a daylight development X-ray film package, the combination according to claim 2, said barrier means comprising a folded sheet of screening with two opposing panels flanking said film and separating it from the walls of said container.

4. In a daylight development X-ray film package, the combination according to claim 2, said barrier means comprising a folded sheet of screening with two opposing panels flanking said film and a second folded sheet of limp water-pervious X-ray transparent material enveloping said panels and separating them from the walls of said container.

5. In a daylight development X-ray film package, the combination according to claim 2, said barrier means comprising a plurality of spaced particles of X-ray transparent material on an inner wall portion of said container.

6. The package of claim 1 in which the barrier means comprises a screen of plastic material.

References Cited in the file of this patent

UNITED STATES PATENTS

| | | |
|---|---|---|
| 1,352,615 | MacLagan | Sept. 14, 1920 |
| 1,879,498 | Richards | Sept. 27, 1932 |
| 2,566,266 | Uhle | Aug. 28, 1951 |
| 2,624,011 | Stern | Dec. 30, 1952 |
| 2,796,526 | Lusebrink | June 18, 1957 |
| 2,802,950 | Gordon | Aug. 13, 1957 |
| 2,894,141 | Kollock | July 7, 1959 |

FOREIGN PATENTS

| | | |
|---|---|---|
| 581,607 | Great Britain | Oct. 18, 1946 |